United States Patent
Eigel

(10) Patent No.: US 10,274,955 B2
(45) Date of Patent: Apr. 30, 2019

(54) METHOD AND DEVICE FOR EMERGENCY ASSISTANCE

(71) Applicant: VOLKSWAGEN AG, Wolfsburg (DE)

(72) Inventor: Thomas Eigel, Berlin (DE)

(73) Assignee: Volkswagen AG (DE)

( * ) Notice: Subject to any disclaimer, the term of this patent is extended or adjusted under 35 U.S.C. 154(b) by 47 days.

(21) Appl. No.: 14/895,576

(22) PCT Filed: May 13, 2014

(86) PCT No.: PCT/EP2014/059753
§ 371 (c)(1),
(2) Date: Dec. 3, 2015

(87) PCT Pub. No.: WO2014/195094
PCT Pub. Date: Dec. 11, 2014

(65) Prior Publication Data
US 2016/0132054 A1 May 12, 2016

(30) Foreign Application Priority Data

Jun. 4, 2013 (DE) .......................... 10 2013 009 339

(51) Int. Cl.
*G05D 1/00* (2006.01)
*B60W 10/04* (2006.01)
(Continued)

(52) U.S. Cl.
CPC ........... *G05D 1/0061* (2013.01); *B60K 28/06* (2013.01); *B60K 28/066* (2013.01); *B60W 10/04* (2013.01);
(Continued)

(58) Field of Classification Search
CPC .... G05D 1/0061; G05D 1/0088; B60K 28/06; B60K 28/066; B60W 10/04;
(Continued)

(56) References Cited

U.S. PATENT DOCUMENTS 5,585,785 A 12/1996 Gwin et al.
9,234,618 B1 * 1/2016 Zhu .......................... G01S 17/10
(Continued)

FOREIGN PATENT DOCUMENTS

CN 103158699 A 6/2013
DE 102004024692 A1 12/2005
(Continued)

OTHER PUBLICATIONS

Beruscha, Frank ,Haptic Warning Signals at the Steering Wheel: A Literature Survey Regarding Lane Departure Warning Systems, Mar. 28, 2011, Haptices-e, the electronic journal of haptic research, vol. 4, No. 5, pp. 1-3.*
(Continued)

*Primary Examiner* — Jerrah Edwards
*Assistant Examiner* — Mathew Franklin Gordon
(74) *Attorney, Agent, or Firm* — Barnes & Thornburg LLP

(57) ABSTRACT

A method and a device for transitioning a vehicle traveling with transverse guidance assistance into a driving state with a reduced collision risk in the event of a driver emergency, wherein the speed of the vehicle is greater than a predetermined threshold speed. The method includes detecting a hands-off situation of the driver in a hands-off phase, outputting a hands-off warning, performing a warning escalation in an escalation phase if there is no response to the hands-off warning, and reducing the vehicle speed in an intervention phase to a speed which is less than or equal to a threshold speed, the vehicle being kept in the current travel lane if there is no response to the warning escalation.

16 Claims, 2 Drawing Sheets

(51) Int. Cl.
  *B60W 10/18* (2012.01)
  *B60W 10/20* (2006.01)
  *B60W 10/30* (2006.01)
  *B60W 30/12* (2006.01)
  *B60W 30/18* (2012.01)
  *B60W 40/08* (2012.01)
  *B60W 50/14* (2012.01)
  *B60K 28/06* (2006.01)
  *B62D 15/02* (2006.01)
  *G08B 21/06* (2006.01)
  *B60W 50/16* (2012.01)
  *B60W 10/184* (2012.01)
  *B60W 30/14* (2006.01)
  *B60W 50/00* (2006.01)

(52) U.S. Cl.
  CPC .......... *B60W 10/18* (2013.01); *B60W 10/184* (2013.01); *B60W 10/20* (2013.01); *B60W 10/30* (2013.01); *B60W 30/12* (2013.01); *B60W 30/143* (2013.01); *B60W 30/18* (2013.01); *B60W 40/08* (2013.01); *B60W 50/14* (2013.01); *B60W 50/16* (2013.01); *B62D 15/025* (2013.01); *G05D 1/0088* (2013.01); *G08B 21/06* (2013.01); *B60W 2040/0818* (2013.01); *B60W 2050/009* (2013.01); *B60W 2050/143* (2013.01); *B60W 2520/10* (2013.01); *B60W 2540/26* (2013.01); *B60W 2710/18* (2013.01); *B60W 2710/182* (2013.01); *B60W 2710/20* (2013.01); *B60W 2710/207* (2013.01); *B60W 2710/30* (2013.01); *B60W 2720/10* (2013.01)

(58) Field of Classification Search
  CPC .... B60W 10/18; B60W 10/184; B60W 10/20; B60W 10/30; B60W 30/12; B60W 30/143; B60W 30/18; B60W 40/08; B60W 50/14; B60W 50/16; B60W 2040/0818; B60W 2050/009; B60W 2050/143; B60W 2520/10; B60W 2540/26; B60W 2710/18; B60W 2710/182; B60W 2710/20; B60W 2710/207; B60W 2720/10; B62D 15/025; G08B 21/06
  See application file for complete search history.

(56) References Cited

U.S. PATENT DOCUMENTS

| | | | |
|---|---|---|---|
| 2004/0016870 A1* | 1/2004 | Pawlicki | B60K 31/0008 250/208.1 |
| 2006/0180379 A1* | 8/2006 | Ferrone | B60K 28/066 180/272 |
| 2009/0234543 A1* | 9/2009 | Groitzsch | B60T 7/22 701/45 |
| 2011/0001617 A1 | 1/2011 | Roelke et al. | |
| 2012/0191266 A1* | 7/2012 | Kluge | B62D 15/025 701/1 |
| 2016/0114832 A1* | 4/2016 | Taniguchi | B62D 6/008 701/41 |

FOREIGN PATENT DOCUMENTS

| | | |
|---|---|---|
| DE | 102004041225 A1 | 3/2006 |
| DE | 102004047861 A1 | 4/2006 |
| DE | 102005017242 A1 | 10/2006 |
| DE | 102005052032 A1 | 5/2007 |
| DE | 102006056094 A1 | 5/2008 |
| DE | 102007043604 A1 | 3/2009 |
| DE | 102009041187 A1 | 2/2011 |
| DE | 102010062012 A1 | 5/2012 |
| DE | 112009004689 T5 | 10/2012 |
| DE | 102011109618 A1 | 2/2013 |
| EP | 2314490 A1 | 4/2011 |
| JP | 2003058993 A | 2/2003 |

OTHER PUBLICATIONS

Waldmann et al.; The Emergency Stopping Assistant—Safe Stopping in the Event of Sudden Incapacity of a Vehicle Driver to Drive; 3rd German AAL Conference; Jan. 26-27, 2010; Berlin, Germany.
Search Report for German Patent Application No. 10 2013 009 339.2; dated Oct. 21, 2013.
Search Report for International Patent Application No. PCT/EP2014/059753; dated Jul. 10, 2014.

* cited by examiner

METHOD AND DEVICE FOR EMERGENCY ASSISTANCE

PRIORITY CLAIM

This patent application is a U.S. National Phase of International Patent Application No. PCT/EP2014/059753, filed 13 May 2014, which claims priority to German Patent Application No. 10 2013 009 339.2, filed 4 Jun. 2013, the disclosures of which are incorporated herein by reference in their entirety.

FIELD

Illustrative embodiments relate to a method for transferring a traveling vehicle into a driving state with a reduced risk of the consequences of a collision in the event of the driver experiencing an emergency, that is to say to emergency assistance and to a corresponding emergency assistance system.

BACKGROUND

In the field of active safety of a motor vehicle, contemporary driver assistance systems are already able to perform driving tasks of the driver of a motor vehicle and to carry out partially automated or partially autonomous driving functions. This is manifest in the examples of adaptive cruise control or lane assist or heading control.

However, these driver assistance systems are not configured for partial or total failure of the driver of the motor vehicle. Such failure of the driver to carry out the driving functions for which he is responsible can be caused, for example, by excessive fatigue or by a suddenly occurring health problem of the driver. Excessive fatigue often brings about momentary nodding off and an associated brief loss of control of the vehicle. A health problem is understood here to be physical incapacity of the driver to control the motor vehicle, and can be caused, for example, by a sudden heart attack. Such situations often lead to serious accidents, in particular if the vehicle is moving at a high speed on a freeway or a road similar to a freeway.

Since such situations which result in accidents also occur as a result of health problems, in particular heart problems and circulation problems, of relatively old people, the BMFT (German Ministry for Education and Research) started the SmartSenior project which has the purpose of developing technical measures for helping elderly people to continue to participate in everyday life. Within the scope of this project, an emergency stopping assistant was developed for ensuring a motor vehicle is stopped safely in the event of a sudden incapacity of the driver of the vehicle to drive.

Illustrative embodiments provide a method and a device, wherein a vehicle traveling at high speed is transferred into a driving state with a reduced risk of the consequences of a collision when it is assumed that the driver is experiencing an emergency and wherein the complexity of the sensor system employed is reduced.

BRIEF DESCRIPTION OF THE FIGURES

Disclosed embodiments will be explained below with reference to the drawings, in which.

DETAILED DESCRIPTION OF THE DISCLOSED EMBODIMENTS

Figure 1:
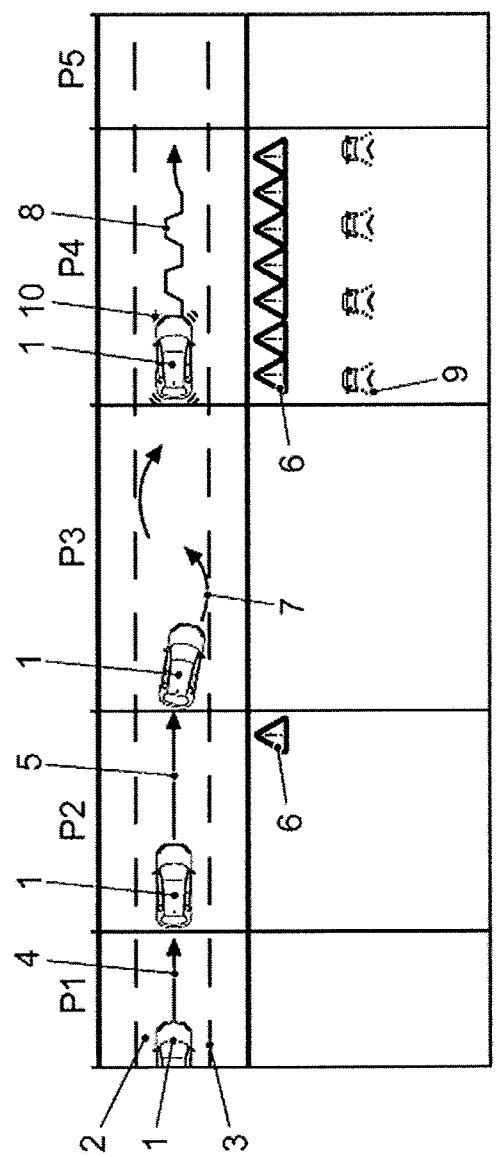
FIG. 1 shows a schematic functional description of the method.

The disclosed method for transferring a vehicle traveling with lateral guidance support into a driving state with a reduced risk of the consequences of a collision in the event of the driver experiencing an emergency, wherein the speed of the vehicle is higher than a predefined speed limit, comprises the following steps:

Detecting a hands-off situation of the driver in a hands-off phase and outputting a hands-off warning, Carrying out a warning escalation in an escalation phase if there is no reaction to the hands-off warning, and reducing the vehicle speed in an intervention phase to a speed which is lower than or equal to the speed limit, wherein the vehicle is kept on the current lane if there is no reaction to the warning escalation phase.

In this way it is ensured that the speed of the vehicle which is traveling, for example, at a high speed on a freeway or road which is similar to a freeway is reduced in the event of an emergency to a speed range whose accident consequences can be coped with. In this context, the single and decisive triggering criterion which is adopted for the implementation of the emergency assistance is the detection of a hands-off situation, but this detection occurs for some time, for example for 10 seconds at maximum. If there is no reaction to the hands-off warning, the method goes into the escalation phase in which it is attempted to provoke the driver or, if appropriate, the front seat passenger to react. If no reaction occurs in this escalation phase either, the method goes into the intervention phase in which, on the one hand, the warning level is increased further and, on the other hand, the speed of the vehicle is reduced to extract collision energy from the rapidly traveling vehicle.

Since the vehicle which is moving at the speed limit is currently not in a stationary state, the consequences of a collision of a tail-end accident are also reduced owing to the comparatively low relative speed compared to a tail-end collision with a stationary vehicle.

In the escalation phase, the intervention of the lateral guidance support may take place at a later time compared to the normal intervention time and the later time is selected as a function of the vehicle speed in such a way that the vehicle is prevented from exiting the current lane. In other words, in the escalation phase the vehicle is no longer kept in the center between the marks of the lane by the lateral guidance support but it swings to and fro between the lane marks. The intention of the swinging of the vehicle between the marks on the two sides of its current lane is to provoke the driver, if he is capable of driving, or the possible front seat passenger, to react, wherein in addition the display of the lateral guidance support can indicate the "switched off" state. Therefore, a conscious driver is given the impression that he is driving without lateral guidance support and that there is a risk of the vehicle leaving the roadway. In addition, the unusual driving behavior alerts the traffic in the surroundings of the vehicle to a possible complication and serves as a warning.

If there is still no reaction in the escalation phase, which can last, for example, up to 10 seconds, in particular 8 seconds, the suspicion of incapacity of the driver to drive becomes greater. However, it is not possible to rule out the possibility of the driver intentionally wishing to test the technology to its limits.

After the escalation phase has run without success, in the subsequent intervention phase the warning escalation may be intensified by virtue of the fact that at least the lateral guidance of the vehicle is further impaired by a jerky lateral profile. In this way, in the intervention phase an attempt is also made to provoke a reaction by the driver or by a possible front seat passenger by means of an uncomfortable driving behavior of the vehicle. In addition, this unorthodox driving style clearly signals to the surroundings of the vehicle that something is wrong with the vehicle; and therefore a warning is issued to the surroundings of the vehicle. In this context, the speed of the vehicle is reduced in the intervention phase.

In the intervention phase braking jolts may also be used for warning escalation. These braking jolts are intended to provoke a reaction on the part of the driver or front seat passenger. The braking jolts also have the additional effect here of issuing a warning to the surroundings of the vehicle.

Finally, in the intervention phase the acoustic and/or visual signals can be intensified to cause the driver to react. In addition, flashing indicator warning system can be activated in the intervention phase to generate a further direct warning to the surroundings of the vehicle.

Optionally, to avoid a tail-end accident the vehicle drives with activated longitudinal guidance support, wherein the longitudinal guidance support can be active or passive in the background.

At least all the longitudinal and lateral guidances may also be deactivated when the speed limit or the emergency speed is reached. In this case, the speed limit can depend on the lane on which the vehicle is located. It is therefore possible in the case of a three-lane freeway for the speed limit of the left-hand lane to be 100 km/h, the speed limit of the middle lane to be 60 km/h and that of the right-hand lane to be 40 km/h. In addition, all warnings to the driver can be deactivated, wherein the flashing indicator warning system for warning the surroundings of the vehicle can still remain active.

It is also possible for the speed limit to be formed by the speed zero, i.e. for the vehicle to be braked to the stationary state in the intervention phase.

If the speed limit is higher than zero, starting from this time, therefore, it must be expected that the vehicle will be involved in an accident whose consequences are limited owing to the emergency speed which is low for a freeway or road which is similar to a freeway. In other words, the vehicle will end its journey in a foreseeable time, for example as a result of it leaving the roadway at a relatively low speed.

If the speed limit is zero, the vehicle remains in its lane.

The disclosed device, which serves for carrying out the method described above for transferring a vehicle traveling with lateral guidance support into a driving state with a reduced risk of the consequences of a collision in the event of the driver experiencing an emergency, comprises:
  a longitudinal guidance assistant,
  a lateral guidance assistant,
  a hands-off detection apparatus, and
  an emergency assistant for carrying out warning escalations and interventions into the driving functions of the vehicle as a function of the results of the hands-off detection apparatus.

After a positive hands-off detection the emergency assistant carries out the warning escalation in at least two successive phases, namely in particular an escalation phase and a subsequent intervention phase, wherein in the escalation phase warnings to the driver or the front-seat passenger are generated to an increased degree, while in the intervention phase interventions are additionally made into the events on the road in addition to further escalation of the warnings. These interventions can be braking interventions and lateral guidance interventions. In addition, interventions into the drive train are also possible to reduce the vehicle speed.

After the intervention phase has run without success and when a speed limit is reached the emergency assistant deactivates the longitudinal guidance and lateral guidance and all warnings.

FIG. 1 describes in a schematic illustration the mode of functioning of the method for transferring a vehicle 1 traveling with lateral guidance support into a driving state with a reduced risk of the consequences of a collision in the event of the driver supposedly experiencing an emergency, which method is implemented in an emergency assistant. The method reduces the speed of the vehicle 1 in a controlled fashion to an emergency speed, wherein the method is based on a hands-off detection.

In a first phase P1, a vehicle 1 is moving on a lane 2, for example of a freeway or of a road which is similar to a freeway, which lane 2 is delimited from adjacent lanes by marks 3. In this phase P1, the driver is incapable of driving and the vehicle 1 is moving with activated lateral guidance support along a driving trajectory 4 which keeps the vehicle 1 centrally on its lane 3 by means of the lateral guidance support, that is to say a lanekeeping assistant or lane assist. Longitudinal guidance, such as for example ACC, can be active or inactive here.

In the second phase P2, the hands-off phase, a hands-off apparatus detects that the driver of the vehicle 1 is no longer holding the steering wheel. After a sufficient period of time which is necessary to detect the hands-off and which can be between 2 and 10 seconds, a hands-off warning is issued by means of at least one acoustic warning which is symbolized by the warning signal 6 in FIG. 1. During the second phase P2 the lateral guidance support remains active and keeps the vehicle 1 along the central driving trajectory 5. After the expiry of the second phase P2 and the outputting of the hands-off warning 6, it is, however, not possible to draw conclusions as to whether the driver has intentionally or unintentionally no contact with the steering wheel, as has been explained already above.

If the driver of the vehicle 1 does not react to the hands-off warning indicator messages 6, this can indicate that the driver is intentionally driving in a hands-free fashion to test the automatic driving possibility of the lateral guidance. This needs to be prevented. The absence of steering interventions, detected by the hands-off detection, can, however, also mean that the driver of the vehicle 1 is not capable of driving. This can be caused by a medical emergency or by the driver falling asleep, for example, owing to excessive fatigue.

In the third phase P3, the escalation phase, the intention is therefore to make an attempt, independently for the reason of the lack of steering activity, to reactivate the driver or activate the front seat passenger. For this purpose, when the third phase P3 is entered, a first step of the warning escalation is carried out, and the intention is to give the driver or front seat passenger of the vehicle 1 the impression that the lateral guidance assistance is deactivated. This is brought about by virtue of the fact that the vehicle 1 is no longer kept in the center of the vehicle's own lane 2. In addition, the impression is given that the lateral guidance is deactivated in that the display of the lateral guidance is switched off. In the background, the emergency assistant, activated in the escalation phase P3, causes the lateral guidance of the vehicle 1 to intervene at a later time compared to the normal behavior of the lateral guidance, wherein the later time is, however, selected such that the vehicle 1 just fails to exit the lane 2. The vehicle oscillates, as it were, to and fro between the left-hand and right-hand marks 3 of the lane 2, along a driving trajectory 7 of the third phase P3. For the driver of the vehicle 1, who had, for example, fallen asleep briefly or who wished to test the technology to its limits, this gives the impression that the lateral guidance is deactivated and he must consequently assume responsibility for driving again. If the driver continues to remain inactive, which appears to make incapacity to drive more probable, this is also an urgent indication to a possible front seat passenger to become active then by, for example, taking over the steering or taking some other measure. Since the emergency assistant is activated in the background in this third phase P3, the vehicle 1 is kept in the lane 2 and cannot leave it.

If the driver of the vehicle 1 continues to exhibit no reaction, the method goes into the fourth phase P4, the intervention phase, in which, on the one hand, the warning escalation is intensified and, on the other hand, a reduction in the speed of the vehicle is brought about by a suitable intervention in the control of the vehicle 1. In other words, the emergency assistant then acts in the foreground. The further warning escalation can then be brought about by continuous acoustic warning, such as is illustrated schematically by the multiplicity of warning symbols 6 in FIG. 1. In addition, the vehicle 1 is placed in an unsteady state by brief braking jolts. To assist reactivation of the driver of the vehicle 1 or to trigger a reaction by the front seat passenger, the lateral guidance of the vehicle 1 is made uncomfortable. This is brought about by steering interventions which generate a jerky lateral profile, as is illustrated symbolically by the driving trajectory 8 of the fourth phase P4. This unusual driving trajectory 8 additionally warns the surroundings of the vehicle 1. In addition, a flashing emergency indicator 9 can indicate that the emergency assistant is active. A further warning to the surroundings can also be issued, for example, by activation of the flashing warning indicator light system 10.

When the emergency speed, which is, for example, 60 km/h on the central lane, is reached, the fifth phase P5 of the method sequence is reached, in which fifth phase P5 longitudinal and lateral guidance and all the warnings are deactivated on the assumption of an uncritical traffic situation. An uncritical traffic situation means here that the further road profile does not have a critical curvature and that no critical approach to a vehicle traveling ahead is detected. Although it appears at first sight that the vehicle in the fifth phase P5 is more or less left to itself, the consequences of an accident of the vehicle at the specified emergency speed are less serious, in particular since it is highly probable that the vehicle will leave the roadway in a foreseeable time. In addition, a tail-end accident with a vehicle traveling behind is less serious owing to the relative speed than with a vehicle in a stationary state on the lane.

Figure 2:
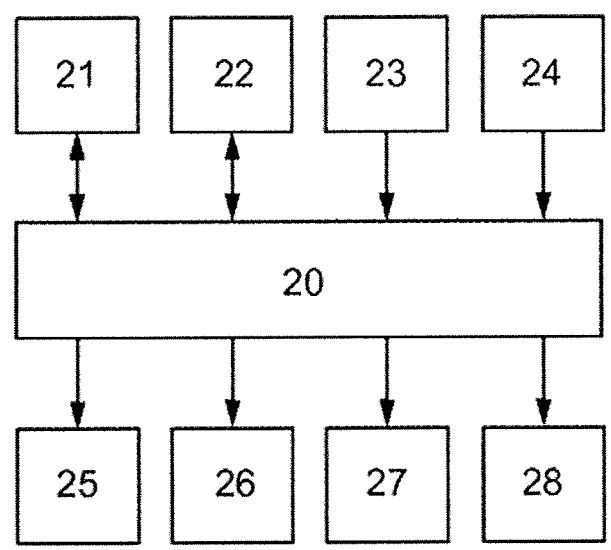
FIG. 2 shows a block diagram of the device for carrying out the method.

FIG. 2 shows in a schematic illustration the disclosed device whose core component is formed by an emergency assistant 20. The emergency assistant 20 is connected to a lateral guidance apparatus 21 and a longitudinal guidance apparatus 22. A lateral guidance apparatus is, for example, a lanekeeping device or a lane assist. For example an adaptive cruise controller, that is to say an ACC, or an emergency braking assistant is possible as a longitudinal guidance apparatus. In addition, the emergency assistant receives information from a hands-off detection 23 and a device 24 for detecting a driver/front seat passenger activity.

On the basis of the result of the hands-off detection 23, the emergency assistant 20 generates suitable warnings 25 of an acoustic, visual and/or haptic nature and carries out steering interventions 26, braking interventions 27 and interventions into the drive train 28.

In the field of active safety of a motor vehicle, contemporary driver assistance systems are already able to perform driving tasks of the driver of a motor vehicle and to carry out partially automated or partially autonomous driving functions. This is manifest in the examples of adaptive cruise control or lane assist or heading control.

However, these driver assistance systems are not configured for partial or total failure of the driver of the motor vehicle. Such failure of the driver to carry out the driving functions for which he is responsible can be caused, for example, by excessive fatigue or by a suddenly occurring health problem of the driver. Excessive fatigue often brings about momentary nodding off and an associated brief loss of control of the vehicle. A health problem is understood here to be physical incapacity of the driver to control the motor vehicle, and can be caused, for example, by a sudden heart attack. Such situations often lead to serious accidents, in particular if the vehicle is moving at a high speed on a freeway or a road similar to a freeway.

Since such situations which result in accidents also occur as a result of health problems, in particular heart problems and circulation problems, of relatively old people, the BMFT (German Ministry for Education and Research) started the SmartSenior project which has the purpose of developing technical measures for helping elderly people to continue to participate in everyday life. Within the scope of this project, an emergency stopping assistant was developed for ensuring a motor vehicle is stopped safely in the event of a sudden incapacity of the driver of the vehicle to drive.

The publication P. Waldmann et al.: "Der Nothalteassistent—abgesichertes Anhalten bei plötzlicher Fahrunfähigkeit des Fahrzeugführers [The emergency stopping assistant—safe stopping in the event of sudden incapacity of a vehicle driver to drive]", 3rd Deutscher AAL-Kongress [German AAL Conference], Jan. 26-27, 2010, Berlin, transcript of conference, ISBN 978-3-8007-3209-8, VDE Verlag Berlin, describes such an emergency stopping assistant. In this context, the emergency stopping assistant for the detected case of physical incapacity of the driver of the vehicle avoids an accident and transfers the vehicle into a safe state. Should this not be possible owing to a complex traffic situation, at least the energy of the vehicle must be reduced as far as possible to reduce the consequences of the accident. A precondition for the emergency stopping assistant is reliable detection of the physical incapacity of the driver of the vehicle, which includes a complex sensor system and an evaluation.

However, the emergency stopping assistant remains to transfer the vehicle into a safe state, i.e. into the stationary state, wherein the emergency stopping assistant is designed here exclusively for use on freeways and main roads which are similar to freeways. In this case, the safe state of the vehicle is ensured in an ideal case by a stationary state on the breakdown lane, wherein to reach the breakdown lane the emergency stopping assistant may, under certain circumstances, have to perform a lane change.

The automated emergency stop on a breakdown lane requires not only reliable lateral guidance and longitudinal guidance, brought about by means of the ACC and the lane assist, but also the possibility of a safe lane change. For this purpose, the emergency stopping assistant must be equipped with a complex surroundings-sensing sensor system to sense objects in the 360° surroundings of the vehicle and track them as well as have a precise digital map for precise vehicle guidance. However, if, for example, the traffic density is so high that a lane change proves to be too difficult, the vehicle is braked to the stationary state within the current driving lane.

Although the traffic behind will be taken into account when this emergency stop is made within the vehicle's own lane on a freeway or a main road which is similar to a freeway, at the speeds which are customary on a freeway, it is possible, owing to the high relative speed between the stationary vehicle and the following traffic, for tail-end collisions to occur with a high input of energy into the stationary vehicle, which can lead to serious consequences of the collision. In addition, in the known emergency stopping system a costly surrounding sensor system is necessary.

DE 10 2011 109 618 A1 describes a method and a device for operating a vehicle, wherein at least when incapacity of the driver of the vehicle to drive is determined, an intervention into a braking, steering and/or drive train function is activated automatically and the vehicle is braked to a standstill. In this context the incapacity of the driver to drive can be determined by means of occurring steering, acceleration and/or brake activation patterns on the basis of detected fatigue of the driver, on the basis of a multiplicity of activated driver assistance interventions within a predefinable time period and/or detected exiting of the vehicle from the carriageway. The vehicle may also be brought to a standstill here on a breakdown lane, which requires a complex surroundings-detection sensor system and the possibility of controlled automatic lane change.

In known emergency stopping assistants, on the one hand, the requirements made of the necessary complex sensor system, in particular that to detect the incapacity to drive, are very stringent and, on the other hand, in the case of a stopping process to a stationary state of the vehicle outside a safe emergency lane or breakdown lane there is the risk of tail-end collisions with a high input of energy. In addition, safe detection of physical incapacity must be ensured.

LIST OF REFERENCE SYMBOLS

P1 First phase
P2 Second phase
P3 Third phase
P4 Fourth phase
P5 Fifth phase
1 Vehicle
2 Lane
3 Marks
4 Driving trajectory first phase
5 Driving trajectory second phase
6 Acoustic/visual warning
7 Driving trajectory escalation phase emergency assistant
8 Driving trajectory intervention phase emergency assistant
9 Visual display emergency assistant
10 Flashing warning indicator light
20 Emergency assistant
21 Lateral guidance apparatus
22 Longitudinal guidance apparatus
23 Hands-off detection
24 Detection of driver activity/front seat passenger activity
25 Acoustic/visual/haptic warning
26 Steering intervention
27 Braking intervention
28 Drive train intervention

The invention claimed is:

1. A method for controlling an automated transfer of a transportation vehicle traveling with lateral guidance support into a driving state with a reduced risk of consequences of a collision in the event of a driver experiencing an emergency, wherein a current speed of the transportation vehicle is higher than a predefined speed limit, the method comprising:

detecting a hands-off situation of the driver and outputting a hands-off warning in a hands-off phase;

carrying out a warning escalation in an escalation phase in response to there being no reaction to the hands-off warning output during the hands-off phase, wherein the warning escalation includes delaying a time of reaction for intervening in lateral guidance of the transportation vehicle so as to be at a later time of reaction compared to lateral guidance support provided in the transportation vehicle prior to the escalation phase for swinging the vehicle within a current lane of travel; and controlling operation of intervention of the lateral guidance support in response to continued driver inactivity, in an intervention phase, whereby the intervention by the lateral guidance support guides the transportation vehicle by steering to generate a jerky lateral profile, wherein steering to generate the jerky lateral profile has a greater intensity than swinging performed for lateral guidance support during the escalation phase.

2. The method of claim 1, wherein the later time is selected as a function of the current speed in such a way that the transportation vehicle is prevented from exiting the current lane.

3. The method of claim 1, wherein, in the intervention phase, the warning escalation is intensified by modifying the lateral guidance of the transportation vehicle to have a jerky lateral profile.

4. The method of claim 3, wherein braking jolts for escalating the warning are used in the intervention phase.

5. The method of claim 3, wherein acoustic and visual signals are intensified in the intervention phase.

6. The method of claim 3, wherein a flashing indicator warning system is activated in the intervention phase.

7. The method of claim 1, wherein all the longitudinal and lateral guidance as well as all the warnings are deactivated when a speed limit, which in the case of a multilane road is a function of the lane, is reached.

8. The method of claim 1, further comprising reducing the current speed to a value which is lower than or equal to a speed limit, wherein the transportation vehicle is kept on the current lane, in response to there being no reaction to the escalation phase.

9. A device for transferring a transportation vehicle traveling with lateral guidance support into a driving state with a reduced risk of the consequences of a collision in the event of a driver experiencing an emergency, the device comprising:

a longitudinal guidance apparatus;
a lateral guidance apparatus; and
a hands-off detection apparatus; and
an emergency assistant for carrying out warning escalations and interventions into the driving functions of the transportation vehicle as a function of the results of the hands-off detection apparatus,
wherein after a positive hands-off detection, the emergency assistant carries out the warning escalations in at least two successive driving phases, including an escalation phase and a subsequent intervention phase, wherein in the escalation phase the emergency assistant communicates with the lateral guidance apparatus system to swing the vehicle within a current lane of travel by delaying reaction time of the lateral guidance apparatus to have later timing of reaction then prior to the escalation phase, and wherein in the intervention phase, in response to continued driver inactivity, the emergency assistant communicates with the lateral guidance system to intensify the swing of the transportation vehicle to generate a jerky lateral profile.

10. The device of claim 9, wherein, after the intervention phase has run without success and when a speed limit is reached, the emergency assistant deactivates at least the longitudinal guidance apparatus and the lateral guidance apparatus.

11. A transportation vehicle system for transferring a vehicle traveling with lateral guidance support into a reduced risk driving state, the system comprising:
   a vehicle guidance system for providing guidance support;
   a hands-off detection apparatus for determining sufficient contact with a steering input; and
   an emergency assistant arranged in communication with the hands-off detection apparatus, wherein, responsive to insufficient contact with the steering input indicating continued driver inactivity, the emergency assistant carries out an escalation phase including providing an impression that guidance support is deactivated.

12. The transportation vehicle system of claim 11, wherein the impression that guidance support is deactivated includes delaying lateral guidance of the transportation vehicle such that the vehicle travels out of the center of a current lane of operation.

13. The transportation vehicle system of claim 12, wherein, responsive to insufficient driver activity, the emergency assistant carries out an intervention phase including guiding the transportation vehicle to generate a jerky lateral profile having greater intensity than the delayed lateral guidance of the escalation phase.

14. The transportation vehicle system of claim 13, wherein the intervention phase includes braking jolts.

15. The transportation vehicle system of claim 13, wherein the intervention phase includes reducing a current transportation vehicle speed to a value which is lower than or equal to a speed limit.

16. A transportation vehicle system for transferring a transportation vehicle traveling with lateral guidance support into a reduced risk driving state, the device comprising:
   a vehicle guidance system for providing guidance support;
   a hands-off detection apparatus for determining sufficient contact with a steering input; and
   an emergency assistant arranged in communication with the hands-off detection apparatus, wherein, responsive to insufficient contact with the steering input indicating continued driver inactivity, the emergency assistant carries out an escalation phase including providing an indication that guidance support is deactivated including delaying lateral guidance of the transportation vehicle such that the vehicle travels out of the center of a current lane of operation.

* * * * *